Patented July 7, 1953

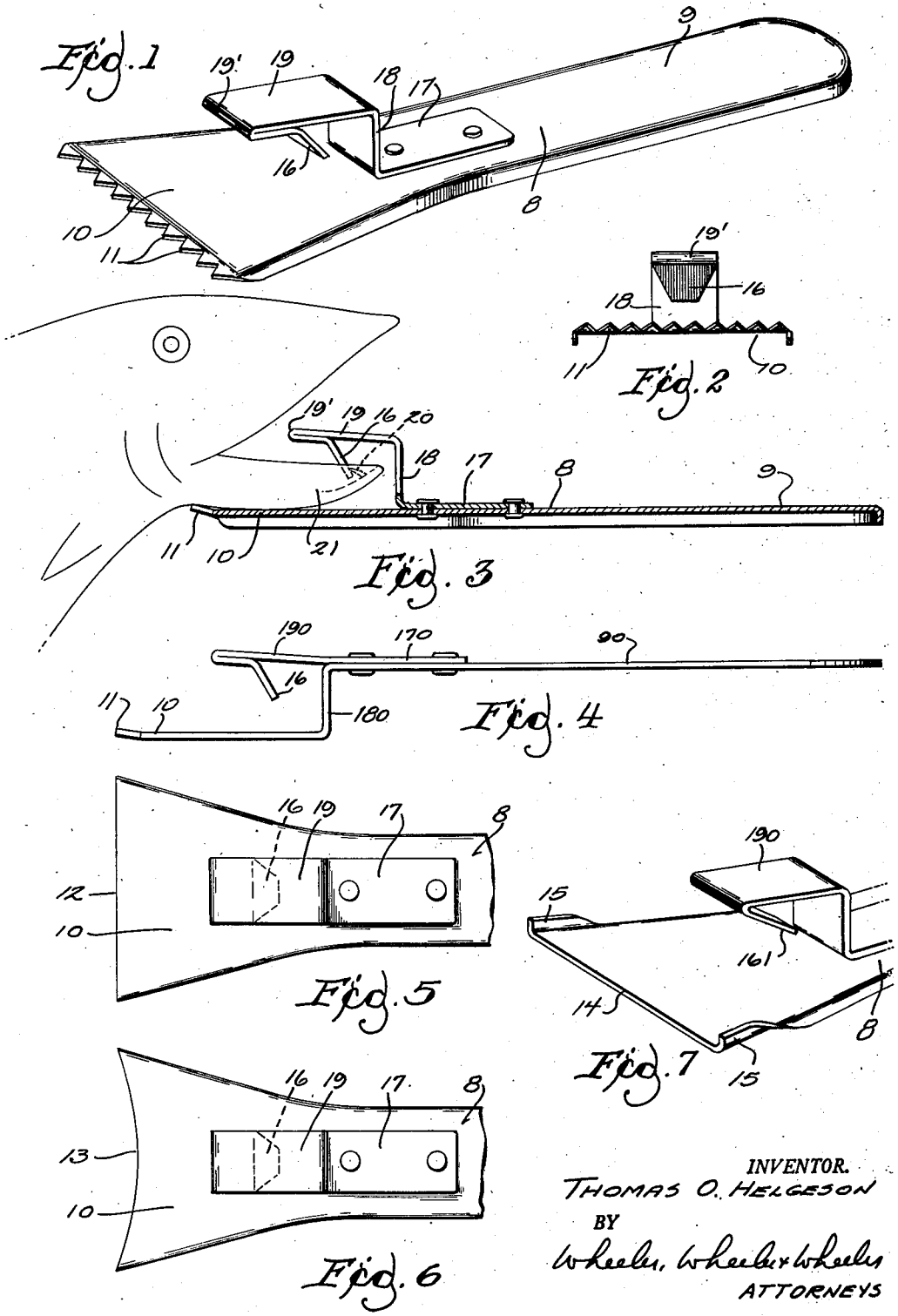

2,644,267

UNITED STATES PATENT OFFICE 2,644,267

FISH HOLDER FOR FISHHOOK REMOVAL

Thomas O. Helgeson, Milwaukee, Wis.

Application February 2, 1952, Serial No. 269,673

10 Claims. (Cl. 43—53.5)

This invention relates to a fish holder for fish hook removal.

Heretofore, the removal of a fish hook from the jaw or gullet of a fish has subjected the operator to the danger of injury either by the teeth or spines of the fish or by the hook itself, due to the activity of the fish.

I have discovered that I can not only hold the fish securely, with its jaws wide open to facilitate removal, but can accomplish this in a manner which seems to paralyze the fish so that he remains immobile during hook extraction. Using the tool herein disclosed, it is a simple matter to engage and support the fish, and hook extraction becomes so easy that it is generally possible to withdraw the hook without even soiling the hands of the operator.

These results are achieved by a tool which has at its extremity a means for externally engaging the fish beneath its lower jaw and toward the rear thereof. Intermediate the ends of the tool, there is an offset and reversely directed hook which enters the fish's mouth and engages the lower jaw internally behind the teeth and the bony structure in which the teeth are mounted. If the tool is then held somewhere near horizontally, the weight of the fish's body forces the jaw wide open and also holds the fish securely and also immobilizes it due to apparent paralysis.

In the drawings:

Fig. 1 is a view in perspective showing the embodiment of the tool.

Fig. 2 is a view in end elevation of the device shown in Fig. 1.

Fig. 3 is a view partially in side elevation and partially in longitudinal section showing the device as it appears in use.

Fig. 4 is a view in side elevation of a slightly modified embodiment.

Figs. 5 and 6 are fragmentary plan views of further modified embodiments.

Fig. 7 is a fragmentary view in perspective of another embodiment of the invention.

Basically the tool comprises a hand lever 8 having a handle portion 9 at one end and a fish engaging fulcrum portion 10 at its other end. The fish engaging fulcrum portion may be formed with teeth 11, as shown in Figs. 1 to 4; or it may have a rectilinear edge 12, as in Fig. 5; or a concave terminal margin 13, as in Fig. 6; or it may have a straight terminal edge 14, as in Fig. 7, with upturned flanges at 15 which constitute single teeth at the corners of the device.

Intermediate the ends of the lever there is an offset and reversely extending hook at 16. In the device of Figs. 1 to 3, a strap 17 is riveted to the handle lever. It provides an offset at 18 beyond which the strap extends forwardly at 19 toward the fulcrum end 10 of the lever. At 19' the strap is folded on itself and its upper end extends obliquely downwardly to constitute the hook 16. The hook is spaced forwardly from the offset 18 and is above the lever in a position to engage the bony structure of the fish inside of the teeth 20 of the fish's lower jaw 21, the forward end portion 10 of the lever being externally engaged beneath the fish's jaw.

The rearward and downward inclination of the hook 16 makes it an easy matter to force the tool into the fish's mouth, even though the fish may be trying to hold his jaws tightly closed. With the tool thus forced into the fish's mouth and the hook portion 16 engaged interiorly behind his teeth, the tool is then moved to a generally horizontal position as in Fig. 3, the handle 9 being used to hold the tool horizontal and to support the weight, or a large portion of the weight, of the fish.

The weight of the fish's jaw 21, exerted over the fulcrum teeth 11 of the tool, will force the fish's jaw 21 open and will bend the fish's body over the fulcrum end of the lever. The only purpose of the teeth 11, or any of the other contour illustrated, is to keep the fish from slipping laterally under its own weight. There is no problem due to any muscular movement of the fish, since the fish is immobilized when thus supported, and acts as if paralyzed.

With the fish thus immobilized and its jaws wide open, the removal of the fish hook is easily effected.

In the construction of the fish hook in Fig. 4, the handle 90 provides an offset at 180 comparable to the offset provided at 18 in the strap of the device of Figs. 1 to 3. This allows the strap 170 to extend forwardly from its pivotal connection with the handle lever 90, with no offset except such as is desirably provided by a slight upward inclination at 190. The relationship between the jaw engaging hook 16 and the fulcrum end of the handle lever is the same regardless of whether the offset is provided by the handle lever or the strap. Fig. 7 shows a further slight modification in that the hook 161 extends directly from the end of the strap portion 190 without the strap being tightly bent back upon itself as in Fig. 1. Such details are not important to the result and any of the fulcrum end contours shown may be used either with the offset strap or the offset handle, as may be desired.

I claim:

1. A fish handling tool comprising a hand lever having a handle portion adjacent one end of the tool and a fulcrum portion at the other end of the tool and adapted for external fish jaw engagement, supporting means on said lever and a reversely extending hook on said supporting means and spaced rearwardly and upwardly from said fulcrum portion, said hook comprising means for engaging the lower jaw of the fish internally behind the teeth thereof, the flexing of the fish over the fulcrum portion when lifted by the tool acting to force the fish's mouth open and to immobilize the fish.

2. The device of claim 1 in which the hook supporting means comprises a strap connected to the hand lever intermediate its handle and fulcrum portions, said strap having a strap portion adjacent its free end spaced from the hand lever and having a free end extending obliquely downwardly and rearwardly from said portion to constitute said strap hook.

3. The device of claim 2 in which said strap has an offset intermediate said strap portion and said hand lever to space said portion from said lever.

4. The device of claim 2 in which said lever has an offset downwardly at a point between its fulcrum end and the connection of said strap with said lever whereby to space said hook from the lever portion adjacent its fulcrum end.

5. A fish handling tool comprising a hand lever having a handle portion adjacent one end and a fulcrum portion adjacent its other end adapted for external engagement beneath the head of a fish, strap means connected with said lever intermediate the handle portion and the fulcrum portion thereof and including a part projecting from such connection toward the fulcrum end of the lever, the portion of the lever adjacent its fulcrum end and the said part being mutually spaced and the said part having a free end portion extending downwardly from said part in said space in a position for engaging interiorly with a fish's lower jaw behind the teeth thereof when said fulcrum end is externally engaged beneath a fish's head.

6. The device of claim 5 in which said fulcrum end has teeth to position the fish's head securely thereon.

7. The device of claim 6 in which the said teeth comprise a series of serrations substantially continuous across the fulcrum end of said hand lever.

8. The device of claim 6 in which the fulcrum end of said hand lever has teeth at its corners only.

9. The device of claim 6 in which the fulcrum end of the hand lever has a concave transverse edge.

10. A device to hold open the mouth of a fish, said device comprising a lever having a fulcrum portion at one end for external fish jaw engagement, and means spaced from said fulcrum portion for internally engaging the jaw of the fish to confine said jaw between said fulcrum portion and said means, whereby pressure of the fulcrum portion against the jaw will flex the fish over the fulcrum portion to force the fish's mouth open.

THOMAS O. HELGESON.

References Cited in the file of this patent

UNITED STATES PATENTS

| Number | Name | Date |
|---|---|---|
| 512,162 | Cuddy | Jan. 2, 1894 |
| 840,580 | McMillan | Jan. 8, 1907 |
| 1,217,745 | Gracey | Feb. 27, 1917 |
| 2,118,159 | Castner | May 24, 1938 |